United States Patent [19]

Koch

[11] 4,065,519
[45] Dec. 27, 1977

[54] PROCESS FOR COATING FINE POWDERS WITH A NYLON AND PRODUCTS MADE THEREWITH

[75] Inventor: Robert B. Koch, Reading, Pa.

[73] Assignee: Rilsan Corporation, Glen Rock, N.J.

[21] Appl. No.: 673,644

[22] Filed: Apr. 5, 1976

Related U.S. Application Data

[60] Division of Ser. No. 593,108, July 3, 1975, which is a continuation-in-part of Ser. No. 509,008, Sept. 25, 1974, abandoned, which is a continuation-in-part of Ser. No. 435,944, Jan. 23, 1974, abandoned.

[51] Int. Cl.$^2$ .............................................. C08L 77/00
[52] U.S. Cl. ..................... 260/857 TW; 260/857 UN; 260/857 R; 264/122; 264/126; 428/394; 428/900
[58] Field of Search ............... 264/109, 122, 126, 111, 264/24; 427/220, 221; 428/394, 900; 260/857 TW

[56] References Cited

U.S. PATENT DOCUMENTS

| 3,185,589 | 5/1965 | Damm, Jr. | 117/100 |
| 3,194,859 | 7/1965 | Wacker | 264/122 |
| 3,336,244 | 8/1967 | Rockoff | 264/126 |
| 3,421,931 | 1/1969 | Reverand | 117/100 |
| 3,655,850 | 4/1972 | Woodham et al. | 264/122 |
| 3,822,177 | 7/1974 | Moked | 264/109 |

Primary Examiner—Robert F. White
Assistant Examiner—James R. Hall
Attorney, Agent, or Firm—Dorfman, Herrell and Skillman

[57] ABSTRACT

A method for coating powders with nylon by mixing the powder with the nylon and a solvent for the nylon, precipitating the nylon out of solution and coating the powder particles, and separating the coated powder substantially in the form of agglomerates of individually coated particles. The coated powder can then be readily compressed to form a shaped structure, such as, a molded article. A nylon coated powder especially suitable for conversion into shaped structures by melt processes, such as, injection molding or melt extrusion, is obtained by incorporating an organic polymer modifier into the nylon coated powder.

25 Claims, No Drawings

PROCESS FOR COATING FINE POWDERS WITH A NYLON AND PRODUCTS MADE THEREWITH

CROSS-REFERENCE TO RELATED APPLICATION

This is a division, of application Ser. No. 593,108, filed July 3, 1975, which is a continuation-in-part of application Ser. No. 509,008, filed September 25, 1974 now abandoned, which in turn is a continuation-in-part of application Ser. No. 435,944, filed January 23, 1974, by the same inventor and now abandoned.

BACKGROUND OF THE INVENTION

This invention relates to a method for coating of powders with nylon and, more particularly, to the production of agglomerates of individual coated particles. This invention further relates to compressing of the coated particles and/or coated powder to form a shaped structure, such as, a molded article.

Various methods of coating finely divided particles of metals or other materials are known and used in the art. These methods lead to products which are advantageous for one or more reasons over the use of the raw materials.

For instance, in the paint and ink manufacturing industries, vast amounts of organic and inorganic pigments are used. These pigments are obtained in finely divided form, the particles often having sizes in the sub-micron range. The pigments, therefore, are extremely bulky and take up large amounts of space. Furthermore, due to their extremely light, fluffy nature, when compounding them into the ink or paint, wetting problems are experienced leading to the need for wetting agents and other additives. Furthermore, during compounding the pigments tend to be dispersed into the air and they create a great contamination problem both within the manufacturing facility and outside of the same. One of the successful methods for combating these problems is the conversion of the pigments into so-called "color concentrates" wherein the pigment is milled into nylon or some other carrier on a roll mill. Of course, during this milling operation, the same handling problems are experienced.

In other industries, such as the manufacture of magnetic articles, it is also necessary to intimately mix finely divided particles of a magnetic material with a resinous substance. Merely mixing the two dry materials is not satisfactory due to the small particle size. One method which has been used is to mix the finely divided metal particles in a molten resin and, after cooling and solidifying the mixture, pulverizing the mass. This is a difficult and expensive process.

A method of producing nylon coated powders which could be used efficiently in forming shaped structures on a commercial scale and which would be free of the aforementioned disadvantages is therefore highly desired.

SUMMARY OF THE INVENTION

A method has been found for providing a nylon coated powder substantially in the form of agglomerates of individually coated particles by mixing the powder with nylon and a solvent for the nylon to effect thorough wetting of the individual particles of the powder with the nylon-solvent system, and removing the solvent from the continuously stirred mixture to effect precipitation of a nylon coating on the individual particles and agglomeration of the individually coated particles. The solvent can be removed by applying heat to the stirred mixture at atmospheric pressure or by reducing the pressure of the reaction vessel below atmospheric. Final traces of solvent can be conveniently removed from the coated powder by exposure in a vacuum oven or by heating the coated powder at atmospheric pressure at a somewhat elevated temperature.

As used in this application, the term "agglomerate" means a mass or cluster of two or more individual nylon coated particles which are adhered to each other by the nylon coating. The size of the agglomerates will depend upon the size and number of the individually coated particles from which the composite is constructed. In general, therefore, the agglomerates will range in size from about 100 millimicrons to about 10,000 microns, and preferably from about 1 micron to about 5,000 microns. Especially preferred are agglomerates ranging in size from 10 microns to about 3,000 microns.

The processes described above are to be distinguished from a number of coating processes described in the art, in particular, in U.S. Pat. Nos. 3,421,931 and 3,185,589, wherein the coating solution is treated with a precipitating agent, such as water or a combination of non-solvents for the coating material, so as to produce a coated powder substantially in the form of individually coated particles.

The coated powder can be charged to a forming apparatus, such as, a mold or die, and compressed as by extrusion, molding or pressing to form a shaped structure of a desired form. The coated powder can be cold pressed, that is, without separate addition of heat, to produce a cold-molded article or structure which has high strength and need not be sintered or further treated to impart desirable physical characteristics to it. The article or structure may, however, be sintered or hot pressed, if desired. If the powder used is a magnetic material, a shaped structure produced therefrom can then be magnetized and used as a magnet, replacing expensive ceramic magnets which are made by sintering processes. Shaped structures made with the coated powder can be formed by compressing the coated powder in forming apparatus by such techniques as hot or cold rolling, extrusion, injection molding, ram extrusion, hot or cold pressing, or other methods known in the art.

In still another aspect of the present invention, it has been found that nylon coated powder which is especially suitable for conversion into shaped structures by melt processes, such as, injection molding or melt extrusion, can be obtained by incorporating with the nylon coated powder an organic polymer modifier. The modified nylon coated powders when used in making shaped structures by forming operations, such as, injection molding or melt extrusion, provide a shorter mold release time than obtained with nylon coated powder which does not contain the organic polymer modifier. The specific mechanism by which the decreased mold release time is effected cannot be fully explained, but, briefly, it is believed that the presence of the organic polymer modifier with the nylon coating on the powder in some way accelerates crystallization or hardening of the formed part or structure. Some organic polymer modifiers can also provide improved chemical and physical properties to the shaped structures made with the modified coated powders. In general, for example, the melt temperature of the modified coated powders may be higher and an improved chemical resistance may be obtained than is the case with the unmodified coated powders, and such properties may be used to advantage in the structure forming operations, as well as in the final shaped structure.

The organic polymer modifier can be incorporated with the nylon coated powder in the powder coating process. For example, the powder to be coated, the nylon, the solvent for the nylon and the organic polymer modifier, can be mixed to effect solution of the nylon in the solvent, then precipitation of the nylon on the powder is effected, thereby incorporating the polymer modifier in the resulting coated powder product from which the solvent has been removed in forming the modified coated powder. Alternatively, the organic polymer modifier can be physically blended with the coated powder of the present invention by feeding the coated powder and the modifier, preferably in finely divided form, into a mixing device or metering device, such as, the feed screw section of an injection molding machine or a melt extruder.

Powders to be Coated

According to the present invention, particles of finely divided powdered material are coated with nylon in a substantially uniform manner. The material being coated can be of any type, the only requirement being that it is not soluble in the solvent used for the nylon and that the coating will adhere thereto. The method of coating powder with nylon is used primarily to coat individual particles of up to about 500 microns in size. In the preferred embodiment, the individual particles to be coated fall within a range of about 1 millimicron to about 150 microns. The most preferred range of individual particle size for coating is from about 1 to about 50 microns. As indicated above, the resulting individually coated particles form agglomerates which will range in size from about 100 millimicrons to about 10,000 microns, and preferably from about 1 micron to about 5,000 microns.

The powder and nylon can be used in varying amounts ranging from about 98:2 to about 5:95 by weight, and preferably from about 98:2 to about 20:80. In the general aspect of the invention, the coating on the particle may be from about 10% by volume to about 90% by volume of nylon on the powder particle. The weight ratio of powder to nylon will vary depending upon the intended application of the coated powder. Thus, when the coated powder is intended to be used in magnets, the powder will be used in greater amounts, i.e., a ratio of about 95:5. In certain color concentrate applications, the powder could be used suitably in an amount of about 20% by weight.

One particular class of materials which can advantageously be coated according to the present invention is powders of magnetic materials, such as, barium ferrite and strontium ferrite, carbonyl iron, various iron alloys and various forms of iron oxides and the like. Also, mixtures of powdered materials can be coated using the process of the present invention and such mixtures include the aforementioned magnetic materials used together with graphite, copper, iron, molybdenum disulfide, alumina, aluminum, and the like.

Other materials in particle form which can advantageously be coated according to the present invention are both organic and inorganic pigments, such as carbon black, cadmium orange-red pigment, and the like. The coated product produced by the inventive method can be a pigment which is an easily handleable concentrate that can be milled with other ingredients or otherwise handled in the same way as other pigments or color concentrates in the paint or ink arts, and the coated pigments of the present invention can also be used in extrusion of plastic materials, such as, nylon, polyethylenes, polypropylenes and the like. Metallic pigments in the form of platelets can also be prepared by the instant process. Suitable pigments include those derived from aluminum, bronze, copper, and the like.

The instant inventive method can also be used to coat any other type of organic or inorganic particulate material which is not soluble in the nylon solution and to which the nylon adheres on precipitation, such as powders of aluminum, lead, barium sulfate, calcium sulfate, nickel, cobalt, silica, clay or tungsten, powdered alloys such as a copper-nickel-iron alloy, alnico, ferrosilicon, stellite, etc., as well as fibrous materials such as potassium aluminum silicate, graphite, glass, boron or calcium silicate.

The Nylon Coating

As used in this application, the term "nylon" is intended to mean a nylon or polyamide which is capable of being drawn into a useful filament or fiber. Any nylon meeting this criterion is suitable for coating the particles, as set forth herein. In general, such nylons have a molecular weight in the range of 10,000 to 20,000 and preferably 12,000 to 20,000. There are many well-known types of these nylons that can be used in the present invention, such as nylon 6—6, which is prepared by the condensation of hexamethylenediamine and adipic acid; nylon 6—10, which is prepared from hexamethylenediamine and sebacic acid; nylon 6, which is prepared by the thermal polymerization of $\epsilon$-aminocaproic acid or the corresponding caprolactam; nylon 11, which is the self-condensation product of 11-aminoundecanoic acid; nylon 4, which is produced from self-condensation of $\alpha$-pyrrolidone; nylon 6/11, which is a copolymer of nylon 6 and nylon 11; nylon 6/12, which is a copolymer of nylon 6 and nylon 12; nylon 6/6—6-/6-10, which is a terpolymer of nylon 6, nylon 6—6, and nylon 6-10; nylon 6/6—6/6-12, which is a terpolymer of nylon 6, nylon 6—6, and nylon 6-12; nylon 6/6—6/6-10/6-12, which is an interpolymer of nylon 6, nylon 6—6, nylon 6-10, and nylon 6-12; nylon 6/6-9-/6-12, which is a terpolymer of nylon 6, nylon 6-9, and nylon 6-12; nylon 6/6-9/6-10/6-12, which is an interpolymer of nylon 6, nylon 6-9, nylon 6-10, and nylon 6-12; nylon 6/11/12, which is a terpolymer of nylon 6, nylon 11, and nylon 12; nylon 6/6-6/12, which is a terpolymer of nylon 6, nylon 6—6, and nylon 12; and the like. The numbering system used is, in fact, an abbreviation of the materials used in the preparation of the nylons. For instance, nylon 6-10 indicates that the diamine contained 6 carbon atoms and the dibasic acid contained 10 carbon atoms. Nylon 6 indicates that the polymer is made from the 6 carbon $\epsilon$-aminocaprioc acid or the corresponding caprolactam. Nylon 6/6-6/12 is a terpolymer of nylon 6, nylon 6—6, and nylon 12. All of these nylons can be used in the invention and the nylons, thus, can be homopolymers, as well as copolymers, terpolymers, interpolymers or the like, and for simplicity, all such polymers, except homopolymers, may be referred to as copolymers hereinafter. In some cases it may be desirable to use a mixture of two or more nylons in solution in the solvent for coating a specific powder or combination of powders, as illustrated in Example XII.

The nylons or polyamides described above can be further characterized as having a type of structure wherein the amide groups of the polymer chain are separated from each other by an alkylene radical, the radical having from 3 to 12 contiguous carbon atoms. Such polyamides are to be distinguished from those produced by reaction of a lower diamine such as ethylenediamine or propylenediamine with a long chain fatty acid such as a dimerized soybean oil fatty acid, use of which in coating finely divided metal particles is described in U.S. Pat. No. 3,185,589.

Because the nylons useful in this invention are so wellknown, being sold under a multitude of trademarks, it is believed unnecessary to describe them in any greater detail, the properties and uses being readily apparent to one or ordinary skill in the art. Reference may be had in this regard to U.S. Pat. Nos. 1,995,291; 2,012,267; 2,130,948; and many others, as well as to "Polyamide Resins," by Don E. Floyd (Reinhold Publishing Corp., 1966) and other such publications, the pertinent parts of which are embodied herein by reference.

The Solvents

The term "solvent" as used herein denotes a material which may be a true solvent or which may form what is known as an "organosol," which is actually a colloidal suspension of the nylon particles swollen with the solvent but now actually dissolved therein. True solvents for the nylons are known and include such substances as phenol, m-cresol, xylenols, and formic acid, in which nylon 6—6, for example, is readily soluble at room temperature. Nylons are soluble in other solvents to some extent at raised temperatures, such other solvents including alkanols, such as, methanol, ethanol, propanol, and butanol for instance, methanol being most suitable. Some interpolymers of various nylons exhibit improved solubility characteristics. Hence, the solvents usable in the present invention are any solvent or solvents that places the nylon in solution.

Preferred solvents, particularly where a polymer modifier is to be introduced in the process, have been found to be mixtures of an alkanol, such as, methanol or ethanol with a chlorinated hydrocarbon, such as, methylene chloride or trichloroethylene. An especially preferred solvent is methanol or a mixture of methanol and methylene chloride in equal parts by weight. Such solvents have the capability of dissolving the coating nylon at relatively moderate temperatures or at temperatures approaching the boiling point of the solvent, whereas they do not dissolve the polymer modifer to an appreciable degree under those conditions. In this application, a solvent for the nylon is considered to be one in which the nylon is dissolved or dispersed to the extent of at least 0.5% by weight at a temperature in the range of room temperature to about 400° F and preferably from about room temperature to about 212° F in the region of the boiling point of water. In general, at least 25% by weight of solvent, based on the weight of the coating mixture, is used.

Various nylons were tested for solubility, these being the nylons sold under the trademark "Platamid" by Rilsan Corporation of Glen Rock, New Jersey. Platamid 005 is a nylon 6/6-6/12 terpolymer, Platamid 006 is a nylon 6/11 copolymer, and Platamid 165 P is plasticized 6/6-6/12 terpolymer. Platamid 005 will solvate up to about 20 grams at room temperature or even higher, in a solution of 50 grams of methanol and 50 grams of methylene chloride. The solution will gel at room temperature in one or two days, but if the solution is heated to about 130° F the gelling time is extended considerably. At 130° F, 40 grams of Platamid 005 can be solvated in 100 grams of methanol. At room temperature, 5 grams of Platamid 005 can be solvated in a mixture of 70 grams of methanol and 30 grams of trichloroethylene. As with the methanol-methylene chloride solvent, however, the solution of Platamid 005 with methanol and trichloroethylene will gel in one or two days at room temperature, but, if heated to about 130° F, the gelling time will be prolonged. Platamid 006 dissolves easily in a 50:50 by weight solution of methanol and methylene chloride at about 130° F. The nylon can be in a concentration as high as 20 parts by weight to 100 parts by weight of the solvents. A solution of 70:30 parts by weight methanoltrichloroethylene can be used. Solutions of Platamid 006 gel quickly after reaching room temperature, generally within one half hour. If kept heated, gelling will not occur. After gelling, the material can be reheated to about 130° F to be brought back into solution. Platamid 165 P will dissolve in 100 grams of 50:50 methanol-methylene chloride to a concentration of about 25 grams of the nylon at room temperature. The solution will remain stable for a considerable period of time. 10 grams of Platamid 165 P can be dissolved in a 70:30 mixture of methanol-trichloroethylene at room temperature. 10 grams of DuPont Elvamide 8061, which is a nylon terpolymer of 6/6—6/6-10 can be dissolved in a solution of 70 grams of methanol and 30 grams of trichloroethylene and the resulting solution is extremely stable and does not gel when subjected to freezing temperatures for 24 hours.

It is noted that it is more difficult and expensive to solvate the homopolymer nylons, such as, nylon 6, nylon 11, and nylon 6—6, which require high temperatures and pressures, as well as more expensive solvents to place the nylons into solution. Hence, in the coating process, it is preferable to use a nylon copolymer that will solvate in a relatively inexpensive solvent, such as methanol or mixtures therewith, at atmospheric pressure or less and at a temperature of 212° F or less.

The Coating Process

In the instant invention, the order of adding the various ingredients, that is, the powder to be coated, the solvent, and the nylon, is not critical and can be varied. For convenience, in the following examples, unless specified otherwise, the solvent was placed into a Waring Blender and the powder was added. The mixer was turned on to disperse the particles in the solvent and wet them thoroughly. The nylon was then added and mixed thoroughly. When necessary, the mixture was heated, with some of the heat being created by the high or rapid stirring. The mixing can be carried out at a temperature of about 68° F, i.e. room temperature, up to about 400° F, and preferably from room temperature to about 212° F. As indicated previously, precipitation of the nylon as a coating on the individual particles of the powder is effected by removing the solvent from the stirred mixture either by heating or by lowering the pressure within the vessel or by a combination of both.

It should be appreciated in passing that in the case where a polymer modified coated powder is to be prepared, the ingredients, that is, the powder, the coating nylon, the solvent and the organic polymer modifier, can be charged to the mixing vessel at the same time or the order of addition can be varied. A convenient procedure is to introduce the coating nylon and solvent into the vessel and effect solution of the nylon, after which the powder and polymer modifier are charged. In general, for these operations, a solvent, such as methanol or ethanol, is used either alone or with a chlorinated hydrocarbon, such as methylene chloride or trichloroethylene. With these solvents, solvation of the coating nylon can usually be effected at a relatively moderate temperature on the order of 120°-130° F or, in some cases, at the boiling point of the solvent or solvent combination, without appreciable solvation of the organic polymer modifier as will be explained more fully hereinafter in a subsequent section.

The coated particles are then dried to form a dry flowable powder. Upon microscopic examination, it is determined that the powder particles are substantially in the form of agglomerates of substantially uniformly coated individual particles. It should be appreciated, however, that there may occur instances in which a particle is not uniformly coated or a spot on a particle is without a comparatively uniform coating, but generally such particles may be considered substantially uniformly coated in accordance with the coating of particles of the present invention.

It should be pointed out that a particular feature of the coating process of this invention is that it provides a considerable measure of control for the size of the agglomerates produced. By maintaining a relatively rapid rate of mixing the composite of wetted particles and nylon coating solution, while removing the solvent, a larger proportion of smaller sized or fine agglomerates is produced. Coated powders comprising the smaller sized or fine agglomerates, for instance, powders containing above 50% by weight of agglomerates of size below 105 microns and the remainder of coarser agglomerates of less than 500 microns, are especially well suited for compression or compaction molding. For making shaped structures by injection molding or melt extrusion, wherein the coated powder progresses through a molten or melted stage, coated powders with a major amount of agglomerates ranging from 500 microns to around 5,000 microns, essentially approaching the size of pelleted material, is preferred. The range in size of agglomerates producible in the coating process of this invention is further illustrated in the Examples. The coating process of this invention therefore clearly represents a highly versatile method for producing coated powders to meet a wide range of processing conditions for making desired shaped structures.

Conversion of Coated Powders to Shaped Structures

The coated powders produced as described above are, in accordance with a further aspect of the present invention, charged to a forming apparatus to make a shaped structure, then compressed in the forming apparatus at a pressure of 200 to 100,000 psi depending on the method of forming used, and, thereafter, the resulting shaped structure is recovered from the forming apparatus. It should be appreciated that the forming apparatus employed to make a shaped structure from the coated powder may comprise a rolling mill, an extrusion machine, a molding machine, a pressing apparatus or the like, which performs such techniques as hot and cold rolling, injection molding, extrusion, ram extrusion, and hot and cold pressing. These techniques have been employed to compress coated powders made in accordance with the present invention and have produced satisfactory shaped structures, such as, extruded parts and molded and pressed articles for different applications, for example, bearings, magnets, induction cores, yokes and other electrical and mechanical elements or parts. As previously mentioned, a nylon coated powder having an organic polymer modifier incorporated therewith is essentially useful in making shaped structures by melt processing, such as injection molding or melt extrusion; as will be explained more fully hereinafter in a subsequent section. When pressing is employed to make a shaped article, for example, from the coated powder, an organic polymer modifier in the coated powder is not necessary and, is generally not employed in compressing or pressing of shaped structures from the coated powders, as described below in this section.

According to the present invention, the coated powder preferably comprising agglomerates of individually coated principles can be compressed under hot or cold conditions. For example, the coated powder can be charged or placed in forming apparatus, such as a mold, and cold pressed to form a shaped structure. Cold pressing involves pressing of the coated powder in a mold, for example, without separate addition of heat to the mold or coated powder as part of the forming operation. The cold pressing can be suitably effected at pressures in excess of about 5,000 psi up to about 100,000 psi, the most suitable range being between about 10,000 and 80,000 psi. Hot pressing can also be used at pressures in excess of about 200 psi up to about 100,000 psi, the most suitable pressure being between about 10,000 and 25,000 psi, depending on the amount of nylon in the coated powder, that is, the greater the nylon content the lower the pressure. The temperature range for pressing can be in the range of from about room temperature, the ambient or evironmental temperature for cold pressing, to a temperature about 50° F below the thermal degradation temperature of the nylon for hot pressing. The thermal degradation temperature of the nylon should not be confused with the melting point of the nylon, which in some instances may be several hundred degrees below the thermal degradation temperature of the nylon. It should also be understood that under some circumstances, it may be desirable or convenient to perform the cold or hot pressing in environments at temperatures above or below those normally considered as room temperature, hot pressing being carried out on forming apparatus with separate addition of heat to the forming apparatus or coated powder, or both. Although room temperature is generally considered to be between 65° and 75° F, and specifically about 68° F, it should be appreciated that the forming operation, such as cold pressing, can be carried out at room temperatures close to freezing, such as 40° to 50° F, and at room temperatures of up to 100° F or more, if desired to be a convenient temperature in the manufacturing facility. Of course, there may be instances where it would be desirable to press the coated powder at temperatures below freezing temperature, 32° F, because of handling problems with the coated powder material.

The pressed or shaped structure, when a magnetic material, can be magnetized in the usual manner. The magnet thus produced, without the need for sintering, is extremely tough and will not fracture when subject to sudden shock, in contradistinction to ceramic magnets which are extremely susceptible to damage during manufacture and will shatter if dropped. Also, magnets made in accordance with the present invention are capable of having more magnetic material therein to provide a stronger magnet than in other resin bound magnets. It has been observed in particular that particles coated with nylon and pressed as described herein provide an article or structure which is dimensionally stable and is generally capable of retaining its shape above the melting point of the nylon.

It should be mentioned that, if desired, the pressed or molded article or structure can be sintered at a temperature varying from about 75° F below the melting point up to about the thermal degradation temperature of the nylon, preferred range varying from about 50° F below the melting point up to about 75° F above the melting point.

It should be further mentioned that in the shaped structures described above the nylon coating on the individual particles may be considered to function as a binder to maintain the integrity of the shaped structure. In these structures, substantially each individual particle is surrounded by binder, the distribution of binder is substantially uniform throughout and there is substantially no particle to particle contact. Such characteristics are advantageous, especially in articles with high particle to binder loading. In the shaped structures made from the polymer modified coated powders, the binder could also incorporate the modifier.

The Organic Polymer Modifier

As previously mentioned, after the particles are coated with nylon, the coated particles can advantageously be compressed under pressure in forming apparatus to form a shaped structure. However, in melt processing, the copolymer, terpolymer and interpolymer nylons used to coat the particles do not permit melt processing, such as by injection molding, extrusion, ram extension, roll milling, calendaring and the like, in as short a cycle as desired to provide a final stable product. It has been found, for example, that the coated particles, which have been coated with a copolymer nylon, do not crystallize as rapidly as desired when employed in making parts in an injection molding process, and the preferred nylons to be used in the coating process are copolymers, as they are easily solvated in relatively inexpensive solvents at low temperatures and without elevated pressures. In accordance with another aspect of the present invention, improved results are obtained when an organic polymer modifier is incorporated with the nylon coated powder. The organic polymer modifier may be used to enhance the final product made with the coated powder of the present invention by providing more rapid crystallization of the product in melting processing, for example, to increase the speed of ejection from the mold in injection molding or to decrease the sticking characteristics when forming a product from the coated powder through a set of pinch rolls in extrusion processing, or may be used to enhance the final product by providing increased chemical resistance and/or a higher melt temperature, which may be advantageous.

It should be appreciated that the organic polymer modifier can be incorporated with the nylon coated powder in a number of different manners. One method is to mix the nylon and the solvent for the nylon, then add the powder to be coated and the organic polymer modifier. Thereafter, the nylon is precipitated as a coating on the powder and the solvent is removed, following which the nylon coated powder incorporating the polymer modifier is recovered. It is noted that the sequence of adding the powder and the polymer modifier is not critical and they may be added with the nylon and solvent, for example, if desired. It should also be noted that a preferred manner of removing the solvent from the solution and effecting coating of the particles is to draw a vacuum on the vessel in which the solution is contained while stirring or mixing the solution, which lowers the temperature in the vessel and removes the solvent, effecting a coating of the particles with the nylon and incorporating the polymer modifier in with the final dried coated powder obtained by continued mixing in the vessel. Another method for mixing the polymer modifier with the nylon coated powder is to first prepare the nylon coated powder, as previously explained, and then physically blend, as by simply mixing the pellets of the polymer modifier with the pellets of nylon coated powder. The resulting mixture may be used in forming products by any of the various melt processing techniques. Still another method for effecting mixing of the polymer modifier with the coated powder, which was previously prepared, is to physically blend the two components by a metering technique when the two components are, for example, fed directly into the screw of an injection molding machine. It is further noted that, when the components are melt mixed in the screw of the injection molding machine, the nylon coated powder and the polymer modifier form an alloy.

Depending on the method of incorporating the polymer modifier with the coated powder, the size of the polymer modifier particles compared to the particles to be coated will vary greatly. For example, if the polymer modifier is added to the solution of particles to be coated, nylon and solvent, the particles may be 20 microns or below in size and the polymer modifier particles may be several millimeters in size. However, if the polymer modifier is mixed with the coated powder by melt processing, the size of the polymer modifier particles should vary with the extent of mixing, that is, if very little mixing takes place, the particles should be small, whereas if mixing is significant, the particles of polymer modifier may be comparatively large. In general, it is preferred that the size of the polymer modifier particles be no larger than about 700 microns, irrespective of the method of incorporation, to insure that the modifier is distributed relatively uniformly throughout the coated product to avoid any degradation or non-uniformity in physical properties of shaped structures made from the modified coated powder.

The organic polymer modifier to be used in the process of this invention can be any polymer which is not appreciably soluble in the solvent under the particular coating conditions employed, and which does not entail any undesirable effect on chemical, mechanical or physical characteristics of the nylon coated powder or products produced therefrom, that is, the organic polymer modifier is compatible with the coating powder. Preferred organic polymers are those which are essentially thermoplastic and have a melting temperature above 200° F. Typical thermoplastic polymers include the various nylons and other polymers, such as, polyethylene, polypropylene, polystyrene, polyacrylates, polymethacrylates, polyphenylene sulfide, acrylonitrile/butadiene/styrene resin (ABS), polyurethane, and polyesters. Especially preferred polymers are certain nylons such as nylon 6 prepared by polymerization of $\epsilon$-aminocaproic acid or the corresponding caprolactam; nylon 11 which is the self-condensation product of 11-aminoundecanoic acid; nylon 4 which is produced from α-pyrrolidone; nylon 6—6 which is produced from hexamethylenediamine and adipic acid; nylon 6-9 which is produced from hexamethylenediamine and azelaic acid; nylon 6-10 which is produced from hexamethylenediamine and sebacic acid; nylon 12 which is produced from dodecyllactam; and nylon 6-12 which is produced from hexamethylenediamine and 1,12 dodecanedioic acid.

It will be recognized that the several nylons listed above may be categorized as homopolymers which generally crystallize rapidly during melt processing with the nylon coated powder to provide an improved product. Certain nylon copolymers may also be operable to provide the desired result and these copolymers tend to be relatively insoluble in the particular coating solvent under the preferred coating conditions, which involves temperatures of 212° F or less and pressure of atmospheric or below. Typical of such nylons would be a nylon 6/11 copolymer or a nylon 6/6—6/6-10 copolymer, wherein a major component consists of a homopolymer and the copolymer moiety represents only a small portion of the total polymer composition.

The weight ratio of organic polymer modifier to coating nylon can be in the range of about 20:1 to 1:20, depending upon the specific materials being used and the characteristics of the final shaped structures that may be desired. Preferred weight ratios are in the range of about 5:1 to 1:5. The modifier can be incorporated most conveniently when it is in a relatively fine state of subdivision, although the specific particle size employed is not especially critical.

It should be appreciated that in melt processing, such as, injection molding, it is desirable to have an injection molding cycle of less than a minute, such as forty-five seconds or less to form a suitable product that is not adversely affected upon or after removal from the mold. Although full crystallization of the injection molded product may not occur for about two days in some instances, the mold cycle is performed in less than a minute, without the product sticking to the mold or being hard to remove or deforming upon or after removal. The basic parameter for selection of the polymer modifier is that it provide to the nylon coated powder an improved chemical resistance, a higher melt temperature or melt point to the final product, and/or more rapid crystallization of the product formed therewith. More particularly, concerning crystallization, the polymer modifier incorporated with the coated powder may advantageously provide an increased processing speed during injection molding, for example, without a deleterious effect on the final product formed with the nylon coated powder.

It should also be appreciated that in injection molding with two polymers in the coated powder, the injection molding melt temperature, as shown in the examples hereinafter set forth, should be higher than the melt temperature of both polymers, and preferably about 90° F above the highest melt temperature of the composite material.

Utility of Coated Powders

Articles or structures which can be produced from the coated powders of this invention can be used in such applications as magnets, as noted above, self-lubricating and externally lubricated bearings, induction cores, deflector and induction yokes for television receivers, soft and hard magnetic cores, electric motor brushes, electrical contacts, stators and rotors of electric motors, color concentrates, injection and compression molded parts, extruded shapes, gaskets and tracer elements for medical applications.

DESCRIPTION OF PREFERRED EMBODIMENTS

The preferred embodiments of this invention are more fully illustrated in the examples to follow. It is to be distinctly understood that the invention is not limited thereto.

EXAMPLE I

In a bowl fitted with rotating beaters to effect agitation, there was mixed at room temperature a powder consisting of 600 grams of 300 M iron powder, sold by A. O. Smith-Inland, Inc., having a particle size up to 175 microns, and 150 grams of finely divided Clevite copper C220, sold by Gould Incorporated, Clevite Engine Parts Division, having a particle size up to about 74 microns, 25 grams of molybdenum disulfide, 38 grams of Platamid 006, and 100 grams of methanol and 100 grams of methylene chloride as solvents. As the mixture was agitated, the solvents were permitted to evaporate and the nylon deposited as a coating on the dispersed powder and the mixture assumed a thick consistency. On complete removal of the solvents, a coated powder, mainly in the form of agglomerates of coated particles, was recovered.

Results similar to those described in the foregoing example were also obtained with nylon 6/6—6/6-10 and nylon 6/11/12 employed as the coating material.

EXAMPLE II

Following the procedure described in Example I, 300 grams of barium ferrite approximately 1.7 microns in particle size were mixed with 200 grams of methanol, 200 grams of methylene chloride, and 15 grams of Platamid 006, at about 130° F. The resulting coated powder after drying in an oven at about 150° to 170° F was charged into a metal mold and cold pressed at 10,000 pounds per square inch. The resulting green slug was magnetized and was found to have a magnetic strength value (Br) of 1560.

EXAMPLE III

Following the procedure of Example I, 300 grams of barium ferrite of approximately 1.7 microns in particle size were mixed with 400 grams of methanol and 15 grams of Platamid 005 at room temperature. The resulting coated powder produced was dried and pressed. The green slug was magnetized and had a Br of 1560.

EXAMPLE IV

Using the same procedure of Example I, 95 grams of barium ferrite having a particle size of about 0.5 to 1 micron was coated with 5 grams of Platamid 005 in 100 grams of methanol. The dried powder was cold pressed at approximately 20,000 pounds per square inch. The green slug could be severely impacted without fracturing, could be cut with a razor knife and was strong enough to be machined on a lathe, drill, or the like.

The green slug was placed into a dry air oven and heated at 260° F for fifteen minutes and removed. The strength improved slightly over the green slug. Several green slugs were made having a diameter of 1.0 inch and ranging from three-eighth inch to one half inch in length. After sintering, the dimensional change was about 1 mil on the diameter. It was discovered that the green slug had strength and other physical characteristics superior to the prior art sintered ceramic materials which are extremely brittle. Furthermore, it was discovered that sintering did not distort the part in any way. Thus, the shaped article or structure did not require sintering, but if sintering was desired, it did not impart any detrimental properties.

Furthermore, when Platamid 006 was used instead of Platamid 005, the resulting slugs exhibited the same good physical characteristics as in the case where Platamid 005 was used. Furthermore, slugs made with 95% by weight barium ferrite and both Platamid 005 and 006 were boiled in water for 6 hours. No substantial difference in strength characteristics and no change in dimensions were observed.

EXAMPLE V

As a control or comparison, 95% by weight barium ferrite and 5% by weight Platamid 005 having a particle size of up to 80 microns were physically mixed in the dry state at room temperature in a Waring Blender. The resulting mixture was molded at 20,000 pounds per square inch. The resulting slug had zero strength and crumbled when removed from the mold.

EXAMPLE VI

Following the procedure of Example I, a Waring Blender was charged with 285 grams of barium ferrite of 0.5-1 micron particle size and to it were added 150 grams of methanol and 150 grams of methylene chloride. After sufficient agitation to wet out the particles, 15 grams of Platamid 005 at room temperature were added to the solution and agitation was continued until the nylon was dissolved and thoroughly mixed. The resulting coated powder was dried and placed in a mold and cold pressed at between 5,000 and 20,000 pounds per square inch. A strong slug was produced.

EXAMPLE VII

A Waring Blender was charged with 100 grams of methanol and 100 grams of methylene chloride. Fifty grams of cadmium orange-red pigment No. 2050, manufactured by Glidden-Durkee, was added and agitated until the particles were wet out. Fifty grams of Platamid 006 were then added. Agitation was continued at a temperature of about 110° F after the nylon was dissolved. It should be noted parenthetically that the temperature of the mixture in the blender is above usual room temperature, the rise of the temperature above room temperature being dependent on such factors as the speed of the blender and the materials used. The solvent was evaporated and the coated powder was dried for use as a color concentrate.

EXAMPLE VIII

In a Waring Blender, 20 grams of carbon black (Cabot Monarch Black SRS-659) having a particle size of 15 millimicrons were wet out with 150 grams of methanol following which 10 grams of Platamid 005 were added and dissolved. After further mixing during which the temperature of the mixture rose somewhat above room temperature, the solvent was evaporated, and the coated powder was recovered and dried.

EXAMPLE IX

A Waring Blender was charged, at room temperature, with 100 grams of methanol, 100 grams of methylene chloride, 80 grams of barium ferrite (Ferrox RGS), 10 grams of graphite and 10 grams of Platamid 006. Agitation was continued after the nylon dissolved. Thereafter, the solvent was evaporated and the resulting coated powder was dried, then charged into a metal die and pressed at 25,000 psi to make a strong slug. This technique is useful in producing self-lubricating bearings.

Following substantially the procedures described in the foregoing examples, coatings of nylon were applied to powders of iron, steel, strontium ferrite, molybdenum disulfide, graphite, aluminum, alumina, copper, bronze and brass and of mixtures of pigments and articles were molded therefrom.

EXAMPLE X

Using the procedure of Example I, 300 grams of strontium ferrite in particle size of 1 micron were mixed with 200 grams of methanol, 200 grams of methylene chloride, and 15 grams of Platamid 006, at about 130° F. The solvent was evaporated and the resulting coated powder was dried.

The powder was charged into a metal mold and cold pressed at 10,000 pounds per square inch. The resulting green slug was magnetized and was found to have a Br of about 1200.

EXAMPLE XI

Following the procedure of Example I, 300 grams of E794 carbonyl iron, sold by GAF Corporation of New York, New York, having approximately 1 to 1.5 microns in particle size, were mixed with 200 grams of methanol, 200 grams of methylene chloride and 15 grams of Platamid 006, at about 130° F. The resulting coated powder was dried, charged into a mold, and cold pressed at 30,000 pounds per square inch. The resulting slug had good green strength physical characteristics.

EXAMPLE XII

This example illustrates the use of two nylons in the coating of a powder. In a Waring Blender, there was placed 240 grams of barium ferrite having a particle size of about 1.5 microns, 30 grams of Platamid 005, 30 grams of Platamid 006, 300 grams of methanol and 100 grams of methylene chloride. The mixture was stirred while the temperature was raised from that of the room to about 120° F. Upon continued mixing, the solvent evaporated and the ferrite particles were uniformly coated to provide a dried powder coated with Platamid 005 and Platamid 006 substantially in the form of agglomerates, the nylons uniting in a manner similar to an alloy.

EXAMPLE XIII

This example illustrates the use of a number of nylons as organic polymer modifiers incorporated in the coated powders.

The experiments described below were carried out in a closed vessel fitted with rotating beaters to effect agitation, a reflux condenser and a connection to a vacuum system. The ingredients listed in tabular form below were mixed in the proportions by weight shown below in a solvent methanol first at room temperature and then at reflux temperature following which pressure within the vessel was reduced to remove the solvent, agitation being continued throughout the operation until the coated particles were in powder form having a substantially uniform coating of nylon Platamid 006. The powder to be coated (barium ferrite) had a particle size of approximately 1.5 microns.

TABLE I

| Experiment No. | 1 | 2 | 3 | 4 | 5 | 6 | 7 | 8 |
|---|---|---|---|---|---|---|---|---|
| Barium Ferrite | 80 | 85 | 80 | 85 | 80 | 85 | 80 | 85 |
| Platamid 006 | 20 | 15 | 5 | 5 | 5 | 5 | 5 | 5 |
| Nylon 6 | | | 15 | 10 | | | | |
| Nylon 11 | | | | | 15 | 10 | | |
| Nylon 6-6 | | | | | | | 15 | 10 |
| Injection Molding Melt Temp. °F | 425 | 425 | 575 | 575 | 500 | 500 | 600 | 600 |

The recovered coated powders of the experiments noted above were formed into molded parts with a Newburg Screw Ram Injection Molding Machine having a 3-ounce capacity. The injection molding melt temperatures of the packed material in the screw are indicated above in the table for each examplary mixture, the mold temperature for all experiments was about 150° F. The coated powders of Experiments 3 to 8, all of which contained an organic polymer modifier, had mold release times of 30 seconds or less, in forming a cylindrical slug having one inch diameter and five-eighths inch thickness, which would be considered a satisfactory production rate. Parts made from the coated powders of Experiments 1 and 2, which did not contain the organic polymer modifier, did not release satisfactorily from the mold in 60 seconds and, thus, failed to form a satisfactory product. Similarly, clay (Nulok 321L Koalin clay) was coated with Platamid 006 and combined with nylon 6—6, as a polymer modifier, and the modified coated powder was satisfactorily injection molded to display good potential as a bearing material. It is also noted that clay or other powders may be coated with nylon and combined with a polymer modifier to form a bearing. Furthermore, combinations of other powders may be coated and, if desired, combined with a polymer modifier to provide advantageous characteristics to the final compressed or molded shaped structure.

EXAMPLE XIV

This example illustrates in more detail the use of a number of organic polymer modifiers with the nylon coated powders of the present invention with data concerning physical characteristics. The powder to be coated was barium ferrite (Ferro 304 manufactured by the Ferro Corporation) having a particle size of about 1.5 microns and the nylon used for coating was Platamid 006. The different polymer modifiers used are identified below. The ratio by weight of powder/coating/modifier was 80/5/15 in all experiments.

The charge in each case was 3200 grams of barium ferrite, 200 grams of Platamid 006, 600 grams of organic polymer modifier and 1331 grams of methanol. The equipment was as described in Example XIII. The Platamid 006 and boiling methanol were stirred for 16 minutes at about 150° F to effect solution, following which the solution was transferred to a planatary mixer with the barium ferrite and polymer modifier being introduced. The vessel was closed and stirring was started and continued for seven minutes with the mixture being held at the methanol boiling point by the vessel jacket temperature of 195° F. Stirring was continued while pressure within the vessel was reduced to about 40mm. of mercury, which lowers the temperature to about 70° to 85° F to remove the solvent and yield the modified coated powders. This procedure took about 65 minutes.

All of the modified coated powders showed good mold release characteristics in injection molding. Physical properties of molded specimens and conditions for their preparation are shown in Table II below. The different polymer modifiers are designated in Table II by an alphabetical designation and are identified specifically adjacent the corresponding letter in Table III.

TABLE II

| Modifier | Inject Molding Melt Temp. (° F) | Impact Strength (Ft.-Lbs.) | Transverse Rupture (MPSI*) | Mold Time (Sec.) |
|---|---|---|---|---|
| A | 350 | 0.10 | 3.62 | 45 |
| B | 460 | 0.10 | 4.35 | 45 |
| C | 420 | 0.07 | 4.89 | 60 |
| D | 450 | 0.06 | 6.34 | 30–45 |
| E | 620 | 0.11 | 7.79 | 30–45 |
| F | 500 | 0.08 | 5.98 | 30–45 |
| G | 450 | 0.24 | 5.54 | 60 |
| H | 550 | 0.45 | 4.28 | 30–45 |
| I | 580 | 0.40 | 16.3 | 15–20 |
| J | 450 | 0.50 | 14.5 | 30 |

*MPSI designates 1,000 lbs/sq. inch.

TABLE III

| Modifier | Polymer | Source |
|---|---|---|
| A | High density Polyethylene (30-680-B4) | AMOCO |
| B | Polypropylene (10-4018) | AMOCO |
| C | Polystyrene (SMD 3500) | Union Carbide |
| D | Polyacrylate (Lucite 140) | DuPont Co. |
| E | Polyphenylene Sulfide (Ryton PPS-P4) | Phillips Pet Co. |
| F | Acrylonitrile/Butadiene/Styrene (Cycolac T-2500) | Morbon Division |
| G | Polyurethane (Roylar ED-65) | Uniroyal, Inc. |
| H | Polyester (Hytrel 5555) | DuPont Co. |
| I | Nylon 6-6 (Zytel 101) | DuPont Co. |
| J | Nylon 11 | Rilsan Corp. |

The polymer modified coated powders were injection molded with little or no difficulty. With modifier I, mold release of 15 to 20 seconds was obtained; with J, 30 seconds; with D, E, F, and H, 30 to 45 seconds; with C and G, 60 seconds; and with A and B, mold release was not fully satisfactory at 45 seconds. An experiment was conducted using Rilsan C3 (a 10% nylon 6 and 90% nylon 11 copolymer of Rilsan Corp.) as the modifier with the procedure described above, and a satisfactory molded part was obtained with a mold release time of 30 to 45 seconds. As shown in Example XIII, coated powders without a modifier did not give satisfactory parts with mold release at 60 seconds.

As a further control or comparison, barium ferrite was coated with Platamid 006 in the percent by weight of 80/20, and the coated powder was injection molded at a melt temperature of 390° F. The molded part had a mold release time of 60 seconds, and the molded part had a transverse rupture value of 9.9 MPSI. Thus, the effect of certain of the modifiers on physical properties of the molded part should be noted, especially modifier I (nylon 6—6) and modifier J (nylon 11) on which the molded parts showed respective transverse rupture values of 16.3 and 14.5 MPSI, as compared with a value of 9.9 MPSI for the same powder coated with Platamid 006 but without a modifier. It should also be appreciated that it is extremely important from an economic standpoint to have the mold release time as short as possible for mass production of parts.

EXAMPLE XV

This example illustrates the effect of various process variables on the size range of agglomerates produced in the coating process of this invention. The coating operation was carried out essentially as described in Example XIII. The results are summarized in Table IV.

TABLE IV
EFFECT OF PROCESS VARIABLES ON PARTICLE SIZE AND RATE OF METHANOL VAPORIZATION

| Product Composition | | | | | | | | | | | | | | |
|---|---|---|---|---|---|---|---|---|---|---|---|---|---|---|
| % Barium Ferrite (Ferro 304) | 85 | | | | | | | 80 | | | 90 | | 97 | |
| % Platamid 006 | 7.5 | | | | | | | 5 | | | 10 | | 3 | |
| % Nylon 6-6 (Zytel 101 - DuPont Co.) | 7.5 | | | | | | | 15 | | | — | | — | |
| Process Variables | | | | | | | | | | | | | | |
| Run Number | 1 | 2 | 3 | 4 | 5 | 6 | 7 | 8 | 9 | 10 | 11 | 12 | 13 | 14 |
| Mass of solids in slurry (g) | 6000 | 5000 | 5000 | 4000 | 4000 | 4000 | 4000 | 6000 | 5000 | 4000 | 4000 | 4000 | 7150 | 7000 |
| Mass of methanol in slurry (g) | 2000 | 1660 | 1660 | 1330 | 1330 | 1330 | 1330 | 2000 | 1660 | 1330 | 1330 | 1600 | 2860 | 2330 |
| Jacket temperature (° F) | 250 | 250 | 250 | 250 | 250 | 250 | 212 | 250 | 250 | 212 | 212 | 212 | 212 | 212 |
| Stirring rate (*) | 4 | 3 | 1 | 3 | 2 | 1 | 2 | 4 | 5 | 2 | 1 | 3 | 4 | 4 |
| Screen Analysis (%) | | | | | | | | | | | | | | |
| <105u | 51 | 40 | 34 | 39 | 38 | 28 | 37 | 50 | 40 | 38 | 39 | 52 | 61 | 81 |
| 105u -297u | 24 | 31 | 24 | 26 | 39 | 25 | 25 | 27 | 35 | 31 | 30 | 19 | 19 | 13 |
| 297u -500u | 15 | 18 | 17 | 17 | 4 | 17 | 21 | 16 | 20 | 23 | 19 | 14 | 10 | 3 |
| >500u | 11 | 10 | 25 | 19 | 19 | 30 | 19 | 6 | 5 | 8 | 11 | 16 | 9 | 2 |
| Weight percent of original methanol remaining at - minutes of vacuum | | | | | | | | | | | | | | |
| 5 | 54 | 49 | 56 | 45 | 46 | 53 | 48 | 50 | 47 | 48 | 55 | 53 | — | 56 |
| 15 | 30 | 23 | 34 | 12.6 | 18.3 | 28.7 | 23 | 24 | 22 | 23 | 35 | 35 | 41 | 30 |
| 30 | 3.8 | 2.3 | 8.6 | .80 | 1.42 | 2.7 | 2.5 | 2.7 | 3.7 | 2.7 | 9 | 10.5 | 18 | 7.0 |
| 50 | 1.4 | .57 | 1.66 | .22 | .38 | .51 | .68 | 1.3 | 1.5 | .85 | 1.2 | .65 | .63 | .75 |
| 65 | .9 | .39 | — | — | — | .34 | — | — | — | — | .70 | — | — | — |
| 75 | — | — | .53 | — | — | — | — | — | .51 | — | — | — | — | — |
| Batches Averaged | 5 | 2 | 1 | 4 | 1 | 1 | 2 | 2 | 3 | 2 | 1 | 3 | 1 | 1 |

(*) Key to stirring rate of process variables of Table IV:
1 = 18 RPM
2 = 45 RPM
3 = 76 RPM
4 = 5 min. at 45 RPM and remainder at 76 RPM
5 = 15 min. at 76 RPM and remainder at 45 RPM In general, a faster stirring rate favors production of smaller sized agglomerates, whereas a slower stirring rate favors production of larger sized agglomerates. Similarily, a faster rate of solvent evaporation favors larger sized agglomerates, and a slower rate of solvent evaporation favors smaller sized agglomerates. A considerable measure of control is thus afforded with respect to size ranges of agglomerates that may be produced. As mentioned above, a smaller size range of agglomerates is generally desired for coated powders which are to be converted into shaped structures by compaction or compression methods; but for injection molding of shaped structures, larger sized agglomerates are desired especially to facilitate feeding of the coated powder to the forming device.

The nature of the invention should be apparent from the foregoing detailed description. Moreover, while there are shown and described present preferred embodiments of the invention, it is to be distinctly understood that the invention is not limited thereto but may be otherwise variously embodied and practiced within the scope of the following claims.

I claim:

1. A method of making a shaped structure composed of a nylon binder and a material in particle form, substantially each individual particle of the material being surrounded by the binder to form a coated powder, the shaped structure having substantially no particle to particle contact and having distribution of the nylon binder substantially uniform throughout, comprising:
   A. charging into a forming apparatus the coated powder of the material particles coated with the nylon, the nylon being one which adheres to the individual material particles and is capable of being drawn into a filament or fiber and being a polyamide wherein the recurring amide groups are separated from each other by an alkylene radical having from 3 to 12 contiguous carbon atoms,
      1. the coated powder being substantially in the form of agglomerates of individually coated particles of the material,
      2. the coated powder comprising individual particles of the material having a size from about 1 millimicron to about 500 microns and having a substantially uniform coating of nylon, the material particles being insoluble in solvents which dissolve the nylon, the nylon coating representing at least 2% based on the weight of the coated powder;
   B. compressing the coated powder in the forming apparatus at a pressure of about 200 – 100,000 psi to bind and form the coated particles into the shaped structure; and
   C. recovering the shaped structure from the forming apparatus.

2. The method of claim 1 wherein the agglomerates described in step (A)(1) have a size less than about 500 microns and wherein step (B) is carried out at a temperature of about 32° to about 50° F below the thermal degradation temperature of the nylon.

3. The method of claim 1 wherein the coated powder of step (A) is cold pressed in step (B).

4. The method of claim 1 wherein the shaped structure recovered in step (C) is sintered at a temperature of about 75° F below the melting point of the nylon up to about the thermal degradation temperature of the nylon.

5. The method of claim 4 wherein the sintering is carried out at a temperature of about 50° F below the melting point of the nylon to about 75° F above the melting point of the nylon.

6. The method of claim 1 wherein the material particles in the coated powder of step (A) comprise a material capable of being magnetized and wherein the resulting shaped structure recovered in step (C) is sintered at a temperature of about 50° F below the melting point of the nylon to about 75° F above the melting point of the nylon and is thereafter magnetized.

7. The method of claim 1 wherein the material particles of the coated powder of step (A) comprises a bearing material and the shaped structure of step (C) is recovered in the form of a bearing.

8. The method of claim 1 wherein the coated powder of step (A) is hot pressed in step (B).

9. The method of claim 1 wherein the coated powder of step (A) is cold rolled in step (B).

10. The method of claim 1 wherein the coated powder of step (A) is hot rolled in step (B).

11. The method of claim 1 wherein the coated powder of step (A) is injection molded in step (B).

12. The method of claim 1 wherein the coated powder of step (A) is extruded in step (B).

13. The method of claim 1 wherein the coated powder of step (A) is ram extruded in step (B).

14. The method of claim 1 wherein step (B) is carried out at a temperature of about 68° to about 50° F below the thermal degradation temperature of the nylon.

15. A shaped structure produced by the method of claim 1.

16. A method of making a shaped structure composed of a nylon copolymer binder, a material in particle form, and an organic polymer modifier, substantially each individual particle of the material being surrounded by the nylon copolymer binder to form a coated powder, the shaped structure having substantially no particle to particle contact and having distribution of the nylon copolymer binder substantially uniform throughout, comprising:

A. charging into a forming apparatus the coated powder with the organic polymer modifier to form a modified coated powder, the nylon copolymer being one which adheres to the material particles and being a polyamide of the type which is capable of being drawn into a filament or fiber and in which the recurring amide groups are separated from each other by an alkylene radical having from 3 to 12 contiguous carbon atoms;
  1. the modified coated powder being substantially in the form of agglomerates of individually coated particles of said material,
  2. the coated powder comprising individual particles of the material having a size from about 1 millimicron to about 500 microns and having a substantially uniform coating of the nylon copolymer, the material particles being insoluble in solvents which dissolve the nylon copolymer, the nylon copolymer coating representing at least 2% based on the weight of the modified coated powder, B. compressing the modified coated powder in the forming apparatus at a pressure of about 200 – 100,000 psi at a temperature of about 32° to about 50° F below the thermal degradation temperature of the nylon copolymer and of the organic polymer modifier to bind and form the coated particles into the shaped structure; and C. recovering the shaped structure from the forming apparatus.

17. The method of claim 16 wherein the agglomerates of individually coated particles of step (A) have a size from about one micron up to about 5,000 microns and wherein the organic polymer modifier is present in the coated powder in particle form.

18. The method of claim 16 wherein the modified coated powder of step (A) is one in which the weight ratio of individual material particles to nylon copolymer coating is in the range of about 98:2 to 5:95, and the weight ratio of the organic polymer modifier to nylon copolymer is in the range of about 20:1 to 1:20, wherein the nylon copolymer is selected from the group consisting of nylon 6/11, nylon 6/12, nylon 6/6—6/6-10, nylon 6/6—6/6-10/6-12, nylon 6/6-9/6-12, nylon 6/6-9/6-10/6-12, nylon 6/11/12, and nylon 6/6-6/12 and the organic polymer modifier is a nylon homopolymer selected from the group consisting of nylon 6, nylon 11, nylon 12, nylon 6—6, nylon 6-9, nylon 6-10, and nylon 6-12.

19. The method of claim 16 wherein the modified coated powder of step (A) is injection molded in step (B).

20. The method of claim 16 wherein the modified coated powder of step (A) is extruded in step (B).

21. The method of claim 16 wherein the modified coated powder of step (A) is ram extruded in step (B).

22. The method of claim 16 wherein the modified coated powder of step (A) is hot rolled in step (B).

23. The method of claim 16 wherein the shaped structure recovered in step (C) is sintered at a temperature of about 75° F below the melting point of the nylon copolymer up to about the thermal degradation temperature of the nylon copolymer and of the organic polymer modifier.

24. The method of claim 23 wherein the sintering is carried out at a temperature of about 50° F below the melting point of the nylon copolymer to about 75° F above the melting point of the nylon copolymer.

25. A shaped structure produced by the method of claim 16.

* * * * *